United States Patent [19]

Seaford

[11] 4,316,305
[45] Feb. 23, 1982

[54] SWIVEL CASTER ASSEMBLY

[75] Inventor: F. Leo Seaford, Concord, N.C.

[73] Assignee: Wil-Mat Corporation, Gastonia, N.C.

[21] Appl. No.: 159,010

[22] Filed: Jun. 13, 1980

[51] Int. Cl.³ .............................................. B60B 33/00
[52] U.S. Cl. .................................................... 16/21
[58] Field of Search ..................................... 16/21, 18

[56] References Cited

U.S. PATENT DOCUMENTS

| | | | |
|---|---|---|---|
| 793,612 | 6/1905 | Self | 16/21 |
| 1,421,626 | 7/1922 | Warnock | 16/21 |
| 1,588,360 | 6/1926 | Bowen | 16/21 |
| 1,896,978 | 2/1933 | Hele-Shaw et al. | 16/21 |
| 2,787,804 | 4/1957 | Noelting et al. | 16/21 |

FOREIGN PATENT DOCUMENTS 734729  7/1954  United Kingdom ................... 16/21

Primary Examiner—Doris L. Troutman
Attorney, Agent, or Firm—Richards, Shefte & Pinckney

[57] ABSTRACT

An improved caster assembly having a stationary base member, a wheel assembly having a rotatable load-supporting wheel, and a ball bearing arrangement supporting the wheel assembly on the base for swiveling rotation with respect thereto. The ball bearing arrangement includes respective generally arcuate raceway surfaces which extend annularly on the base and wheel assembly in spaced, facing relationship to form a ball bearing raceway therebetween. Each raceway surface including two generally arcuate end portions, a portion at one end of each raceway surface being spaced from a cylindrical plane through the centers of the ball bearings in the raceway and another portion at the other end of each raceway surface intersecting and extending beyond the cylindrical plane from the spaced portion. The raceway surfaces are arranged so that the intersecting portion of each raceway surface is oriented in adjacent, facing relation to the spaced portion of the other raceway surface, whereby the spacing between the two raceway surfaces is offset from the cylindrical plane.

7 Claims, 3 Drawing Figures

SWIVEL CASTER ASSEMBLY

BACKGROUND OF THE INVENTION

The present invention relates to caster assemblies, and more particularly to caster assemblies of the type having a base for affixation to a support member and a wheel assembly supported by the base for rotational swiveling movement with respect to the base.

Caster assemblies are well known and widely used in many areas of everyday life and industry to support heavy objects for relatively easy lateral movement thereof on the wheels of such assemblies. Generally, the wheels of caster assemblies are carried by a swivel element for rotational swiveling movement about an axis perpendicular to the axis of rotation of the wheel whereby the wheel can readily align itself in an appropriate direction under the influence of the load borne thereby as it moves across the caster assembly. In industrial settings, a number of caster assemblies are often utilized in inverted orientation to form a conveyor path for the lateral transportation of heavy loads or objects. Thus, for example, trailers and loading apparatus having load support platforms comprising a plurality of inverted caster assemblies are utilized in the airline industry to facilitate the transportation and the loading of heavy cargo onto airplanes.

Although conventional caster assemblies of the industrial type are generally satisfactory for their various load bearing and transporting functions, such caster assemblies have proven to be susceptible to localized wear when utilized for bearing heavy loads and therefore generally have less than a desirable useful lifespan. Conventional caster assemblies typically utilize a ball bearing arrangement for mounting of the wheel assembly thereof on the base thereof in spaced relation to facilitate swiveling or rotational movement of the wheel assembly with respect to the base. Generally, the wheel of the wheel assembly is mounted in offset relation to the axis of rotation of the wheel assembly to better facilitate such swiveling movement when a load is placed on the wheel. However, as a result of this offset disposition of the wheel, a load imposed upon the wheel in any particular rotational disposition of the wheel assembly with respect to the base tends to be borne by the localized area of the ball bearing arrangement most closely adjacent (e.g. beneath) the wheel, thereby increasing the frictional contact between the respective components of the ball bearing arrangement in such localized area. Moreover, such conventional caster assemblies are typically constructed with the spacing between the facing surfaces of the bearing raceway extending concentrically about the axis of rotation of the wheel assembly at locations directly above and beneath the centers of the ball bearing elements. As a consequence, the aforesaid load imposed on the wheel will tend to be concentrated or localized at a few of the ball bearing elements directly at the point where the raceway spacing occurs and will tend to force the ball bearing elements into such spacing, thereby causing increased wear at the linear area of contact between the ball bearing elements and the raceway spacing while simultaneously increasing the frictional drag that must be overcome to permit the wheel assembly to swivel with respect to the base as the wheel assembly attempts to align itself in the direction of movement of the load being moved thereacross.

In contrast to the above, the present invention provides a caster assembly in which the raceway is uniquely formed and arranged such that the localized frictional forces created in the ball bearing arrangement upon loading of the wheel are applied to the surfaces of the ball bearings which are in contact with continuous portions of the ball bearing raceway to prevent the binding of the ball bearings in the raceway spacing between the base and the wheel assembly to reduce the degree of localized wear caused by such loading, and to reduce the forces necessary to cause desired swiveling of the wheel assembly as a load is moved thereacross.

SUMMARY OF THE INVENTION

The present invention provides an improvement in caster assemblies of the type having a base member for affixation to a support member, a wheel assembly having a rotatable wheel for supporting a load for movement by rotation of the wheel, and a ball bearing arrangement for supporting the wheel assembly on the base member for rotational swiveling with respect thereto. Such a ball bearing arrangement includes respective generally arcuate raceway surfaces extending annularly on the base member and the wheel assembly in facing and spaced relationship to retain ball bearing elements therebetween. Briefly described, the improvement of the present invention comprises each of the raceway surfaces having two generally arcuate end portions, one of the generally arcuate portions at one end of each raceway surface being spaced from a cylindrical plane through the centers of the ball bearing elements and the other generally arcuate portion at the other end of each said raceway surface intersecting and extending beyond such cylindrical plane. The raceway surfaces are arranged so that the intersecting end portion of each raceway surface is oriented in facing, adjacent relation to the spaced end portion of the other raceway surface. In this manner, the spacing between the two raceway surfaces is offset from the cylindrical plane through the ball bearing elements.

In accordance with the preferred embodiment of the present invention, the base member has a generally centrally located hole therethrough, the raceway surface of the base member facing inwardly at the hole and the raceway surface of the wheel assembly being disposed on an outwardly facing surface thereof for disposition within the hole in facing relation to the raceway surface of the base member. The wheel assembly preferably includes a wheel supporting element on which the wheel is mounted for rotation about an axis perpendicular to the rotational swivel axis of the wheel assembly, the raceway surface of the wheel assembly being on the wheel supporting element. The wheel is supported at the extending ends of wheel supporting arms which extend from the wheel supporting element in angular relation with respect to the rotational swivel axis of the wheel assembly, the axis of the wheel being located near the cylindrical plane through the ball bearing elements and preferably outwardly adjacent thereto.

DESCRIPTION OF THE PREFERRED EMBODIMENT

Referring now to the accompanying drawings, the present invention is illustrated as embodied in a caster assembly of the industrial type utilized in inverted disposition in an array of a plurality of identical caster assemblies for forming a conveyor path for laterally transporting heavy loads. The caster assembly, indicated generally at 10 in FIG. 1, comprises a base member 12 for affixation to a support member (not shown), a wheel assembly 14 having a rotatable wheel 16 for engaging and supporting a load for movement by rotation of the wheel 16, and a ball bearing arrangement, indicated generally at 18 in FIG. 2, supporting the wheel assembly 14 on the base member 12 for rotational swiveling movement with respect thereto. However, although the improvement of the present invention is illustrated in a caster assembly of this industrial type, it is to be understood that the present invention is equally applicable for use in any caster assembly comprising a base member and a wheel assembly rotatably supported thereon for swiveling movement by a ball bearing arrangment, without departing from the substance or scope of the present invention.

Figure 1:
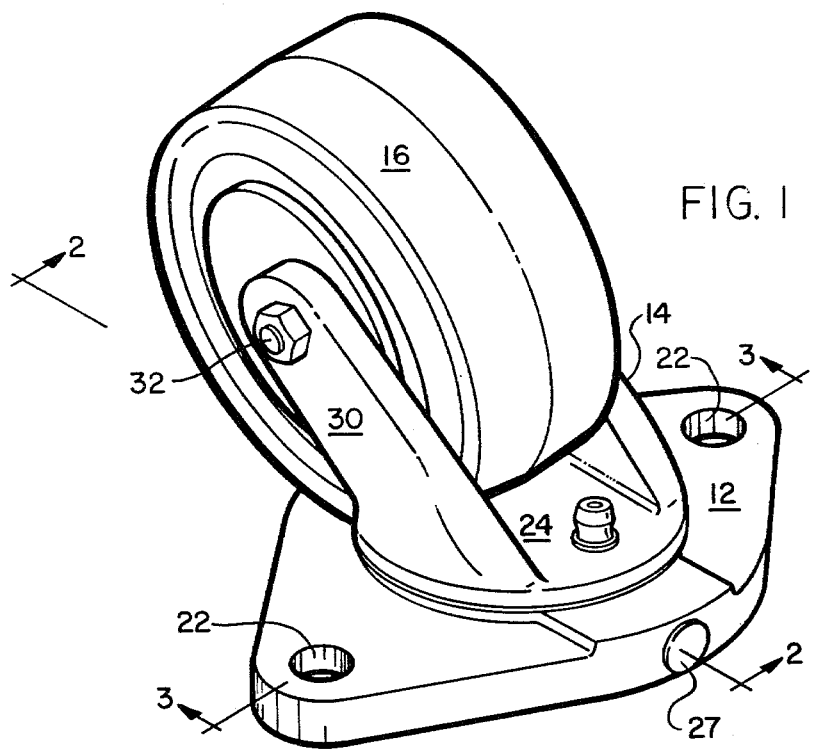
FIG. 1 is a perspective view of a caster assembly according to the preferred embodiment of the present invention, the caster assembly being illustrated in inverted disposition in accordance with a preferred use thereof.
Figure 2:
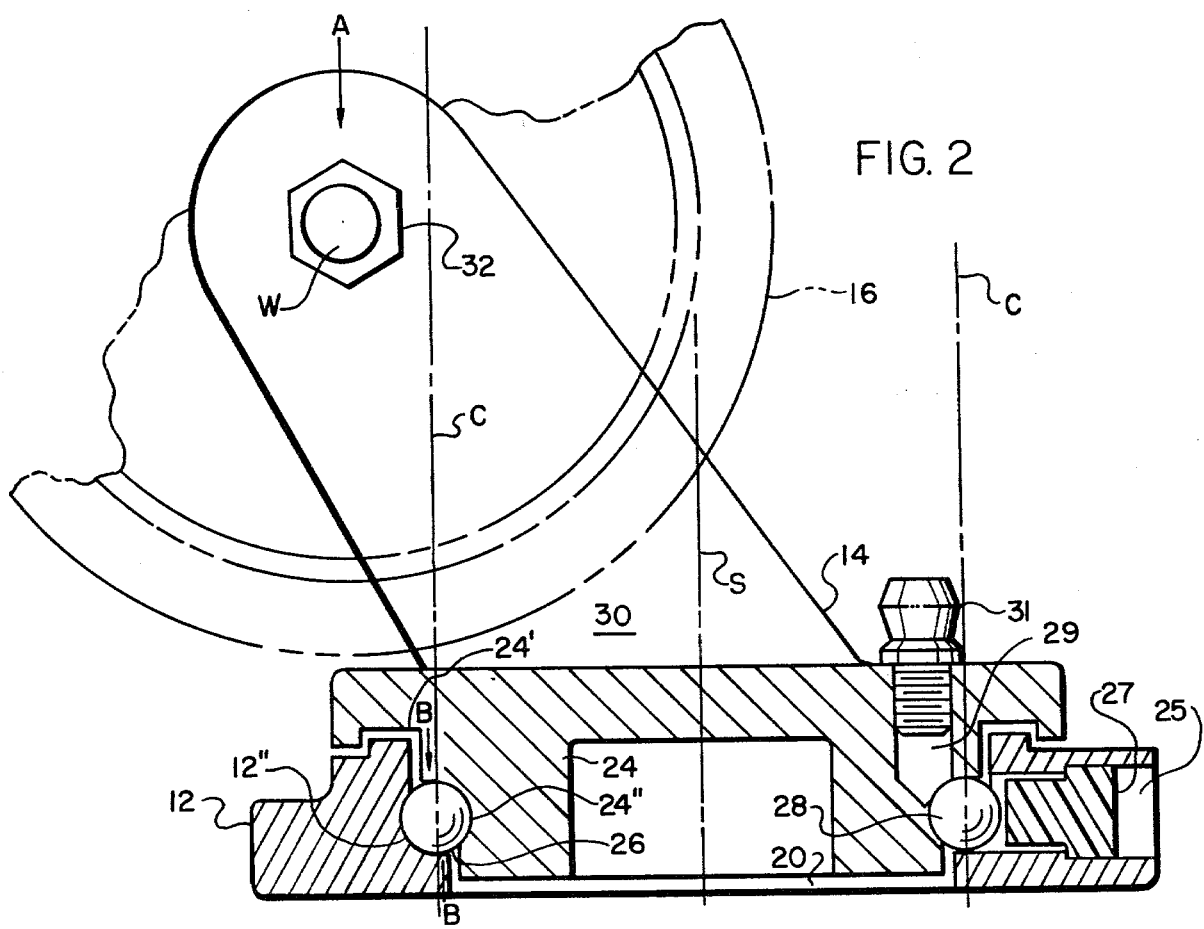
FIG. 2 is a vertical sectional view of the caster assembly of FIG. 1 taken along line 2—2 thereof.
Figure 3:
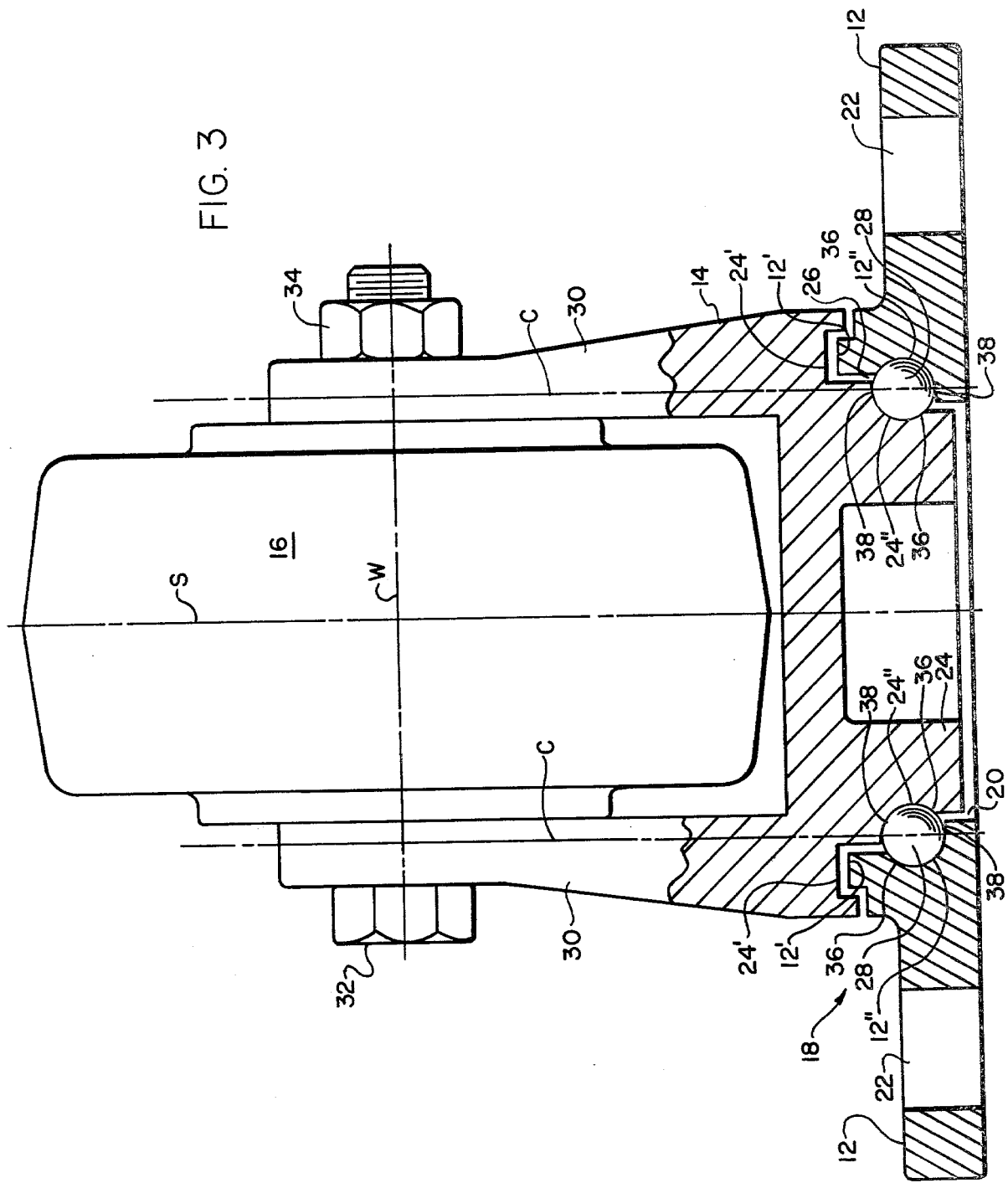
FIG. 3 is another vertical sectional view of the caster assembly of FIG. 1 taken along line 3—3 thereof.

As can best be seen in FIG. 1, the base member 12 is generally oblong in shape, having a generally centrally located hole 20 (FIG. 2) into which extends the wheel supporting element 24 formed at the lower portion of the wheel assembly 14. The base member 12 is also provided with two holes 22 of relatively smaller diameter than its central hole 20 bored through the base member at opposite ends thereof to facilitate the affixation thereof to a support member by a nut and bolt arrangement or the like. The aforementioned ball bearing arrangement 18 comprises a ball bearing raceway 26 formed by and between the outwardly facing annular surface of the wheel supporting element 24 and the inwardly facing annular surface of the base member 12 which defines the central hole 20 thereof, within which raceway 26 are carried a plurality of ball bearing elements 28 for rotationally supporting the wheel assembly 14 for swiveling movement with respect to the base member 12. As is best seen in FIGS. 2 and 3, the base member 12 and the wheel supporting element 24 are formed, respectively, with complementary facing surfaces 12' and 24' profiled to facilitate the disposition and receiving of the wheel supporting element 24 within the hole 20 of the base member 12. The complementary surfaces 12' and 24' each include a generally arcuate raceway surface 12' and 24', respectively, which extend annularly thereabout for disposition in facing and spaced relationship upon positioning of the wheel supporting element 24 within the hole 20 to hold and retain the ball bearing elements 28 therebetween. In this manner, the wheel assembly 14 is rotatable with respect to the base member 12 about a vertical axis S which extends centrally through the wheel supporting element 24 of the wheel assembly 14 in perpendicular relation to the circular ball bearing raceway 26.

As is conventional, the base member 12 is provided with a small bore 25 (FIG. 2) extending from the outwardly facing side surface of the base member 12 inwardly to the raceway surface 12" to facilitate the loading of the ball bearing elements 28 into the raceway 26 during assembly of the caster assembly 10. A ball retaining plug 27 is provided in the bore 25 after loading of the ball bearing elements to seal the bore 25 and to prevent the ball bearing elements 28 in the raceway 26 from re-entering the bore 25 during rotational swiveling movement of the wheel assembly 14. Additionally, a bore 29 (FIG. 2) is provided in the wheel assembly 14 to extend between the upper surface of the wheel supporting element 24 and the raceway surface 24", a grease fitting 31 being disposed within the bore 29 to permit the injection of lubricant into the raceway 26 for lubrication of the components of the ball bearing arrangement 18.

In swivel casters used in industrial applications for moving loads thereacross as described above, the wheel assembly portion of the caster must swivel in response to a load moving thereacross so that the wheel will align itself in the direction of movement of the load and will then rotate freely about its own axis or shaft to provide a rolling, low friction surface across which quite heavy loads will move freely. To promote this load induced swiveling of the wheel assembly, it is common practice to support the wheel with its rotational axis W offset from the swivel axis S of the caster, such as by providing spaced wheel supporting arms 30 which extend upwardly from the support element 24 in angular relation to the swivel axis S of the caster, and by mounting the wheel 16 for rotation about a shaft or bolt 32 that extends through openings at the extending ends of the arms 30 with a securing nut 34 threadably carried at the end of the bolt 32.

However, while this offset mounting of the wheel 16 promotes the desired swiveling of the wheel assembly 14, it also imposes a localized concentration of the load on a certain portion of the ball bearing arrangement 18. Thus, looking at FIG. 2, the rotational axis W of the wheel is offset laterally from the swivel axis S of the wheel assembly, and the vertical load imposed on the wheel, as indicated by the reference character A in FIG. 2, will also be offset from the swivel axis S and will be transmitted to the ball bearing arrangement 18 as a vertical load component and as a pivoting component tending to pivot the wheel assembly 14 with respect to the base assembly 12. As a result, the heaviest concentration of the load is imposed upon that portion of the ball bearing arrangement 18 which is located directly beneath or adjacent to the offset load A at any given disposition of the wheel 16. Moreover, the offset disposition of the load A, and the aforesaid pivotal component thereof, result in the load being imposed on the ball bearing elements 28 through the raceways 12" and 24" in a direction slightly offset from vertical, as indicated by lines B—B in FIG. 2.

In conventional caster assemblies, the raceway for the ball bearing elements are disposed with the spacing therebetween located substantially directly above and beneath the centers of the ball bearing elements. As a result, the aforesaid offset load concentration imposed on a portion of the ball bearing elements located beneath the load as represented by lines B—B in FIG. 2 tends to be located substantially at or within the spacing between the raceways. Accordingly, this load concentration is borne at a location where the ball bearing elements are pressing against the two annular corners of the two raceways, with such load concentration tending to force the ball bearing elements into the raceway spacing, all of which increases the frictional load on the ball bearing arrangement and creates undue wear of the ball bearing elements and at the annular corners of the raceway. In accordance with the present invention, as described below, the raceway surfaces are formed and arranged so that the spacing therebetween is offset from the center of the ball bearing elements so that the concentrated load imposed on the ball bearing elements by the offset wheel will be borne by a continuous or planar portion of the raceway surfaces rather than at or near the spacing between the raceway surfaces.

More specifically, as best illustrated in FIG. 3, each of the raceway surfaces 12", 24" includes a generally arcuate portion 36 at one end or edge thereof, which portion 36 is spaced from the cylindrical plane C extending through the centers of the ball bearing elements 28 of the ball bearing arrangement 18. Additionally, each raceway surface 12", 24" includes another generally arcuate portion 38 at the other end or edge thereof, which portion 38 intersects the cylindrical plane C and extends beyond the plane C. The raceway surfaces 12", 24" are arranged on the base members 12 and the wheel supporting element 24 so that the intersecting end portion 38 of each of the raceway surfaces 12", 24" is oriented in facing, adjacent relation to the spaced end portion 36 of the other of the raceway surfaces 12", 24".

As will be understood by those skilled in the art and as is shown in FIG. 3, this arrangement of the raceway surfaces 12", 24" with respect to the cylindrical plane C locates the spacing between the two raceway surfaces 12", 24" of the complementary surfaces 12', 24' of the base member 12 and the wheel supporting element 24 in offset relation with respect to the cylindrical plane C through the bearing elements 28. Moreover, as hereinabove discussed, the angular extent of the wheel supporting arms 30 of the wheel supporting element 24 is such that the axis W about which the wheel 16 is rotatably supported is located outwardly adjacent the cylindrical plane C. Thus, upon the placing of a load (indicated by arrow A in FIG. 2) on the wheel 16 of the caster assembly 10, the wheel assembly 14, by virtue of the disposition of the axis W of the wheel 16 outwardly of the cylindrical plane C, will tend to pivot slightly about the center of the ball bearing or bearings 28 disposed in the localized area of the raceway 26 immediately below and most clearly adjacent the axis W of the wheel 16. However, as a result of the arrangement of the raceway surfaces 12",24" as described above and the location of the spacing of the respective edges or end portions 36, 38 thereof in offset relation to the cylindrical plane C, the localized frictional and binding forces which are thus applied to the ball bearing elements 28 in this localized area of the raceway 26 are directed to the surfaces of these ball bearing elements 28 which are in contact with the central portions of the raceway surfaces 12",24', such lines of force being represented by arrows B in FIG. 2. Because the application of such forces to the ball bearing elements 28 occurs at a relatively substantial spacing from the spacing between the adjacent edges 36, 38 of the raceway surfaces 12", 24", essentially no binding of the ball bearing elements 28 in such spacing occurs, accordingly substantially preventing localized wearing of the raceway surfaces 12", 24" or their end portions 36, 38 and significantly extending the useful life of the caster assembly 10. Moreover, tests comparing the caster assembly 10 with conventional caster assemblies having conventional ball bearing arrangements have revealed that the forces required to initiate the movement of a load supported on the respective types of caster assemblies, to maintain such movement, and to reverse the direction of such movement, are significantly reduced in the caster assembly 10 over such conventional caster assemblies because of the reduced friction occurring during swiveling of the wheel assembly.

The present invention has been herein described in detail with regard to the preferred embodiment thereof for purposes of illustration only. It is to be understood that modifications and variations may be resorted to without departing from the substance or scope of the present invention, as those skilled in the art will readily understand. Such modifications and variations are within the scope of the present invention which is intended to be limited only by the appended claims and equivalents thereof.

I claim:

1. In a caster assembly of the type having a base member for affixation to a support member, a wheel assembly having a rotatable wheel for supporting a load for movement by rotation of said wheel, said ball bearing means solely supporting said wheel assembly on said base member in spaced relation thereto for rotational swiveling with respect thereto, said ball bearing means including respective generally arcuate raceway surfaces extending annularly on said base member and said wheel assembly in facing and spaced relationship to substantially circumferentially contact and retain ball bearing elements therebetween, the improvement comprising each said raceway surface having two generally arcuate end portions, one of said generally arcuate end portions being spaced from a cylindrical plane through the centers of said ball bearing elements and the other of said generally arcuate end portions intersecting and extending beyond said cylindrical plane, said raceway surfaces being arranged so that said intersecting end portion of each said raceway surface is oriented in facing, adjacent relation to said spaced end portion of the other raceway surface, whereby the spacing between said two raceway surfaces is offset from said cylindrical plane through said ball bearing elements.

2. The improvement in a caster assembly according to claim 1 and characterized further in that said base member includes a generally centrally located hole therethrough, said raceway surface of said base member facing inwardly at said hole with said raceway surface of said wheel assembly being disposed on an outwardly facing surface of said wheel assembly for disposition within said hole in facing relation to said raceway surface of said base member.

3. The improvement in a caster assembly according to claim 2 and characterized further in that said wheel assembly includes a wheel supporting element on which said wheel is rotatably mounted for rotation about an axis generally perpendicular to the rotational swivel axis of said wheel assembly, said raceway surface of said wheel assembly being on said wheel supporting element.

4. The improvement in a caster assembly according to claim 3 and characterized further in that said wheel supporting element includes wheel supporting arms which extend therefrom in angular relation with respect to the rotational swivel axis of said wheel assembly and support said wheel at the extending ends of said arms.

5. The improvement in a caster assembly according to claim 1 or 3 and characterized further in that the axis about which said wheel rotates is located adjacent said cylindrical plane through the centers of said ball bearing elements.

6. The improvement in a caster assembly according to claim 5 and characterized further in that said axis of said wheel is located outwardly adjacent said cylindrical plane.

7. In a caster assembly of the type having a base member for affixation to a support member, a wheel assembly having a rotatable wheel for supporting a load for movement by rotation of said wheel, and ball bearing means solely supporting said wheel assembly on said base member in spaced relation thereto for rotational swiveling with respect thereto, said ball bearing means including respective generally arcuate raceway surfaces extending annularly on said base member and said wheel assembly in facing and spaced relationship to substantially circumferentially contact and retain ball bearing elements therebetween, the improvement comprising each said raceway surface having two generally arcuate end portions, one of said generally arcuate end portions being spaced from a cylindrical plane through the centers of said ball bearing elements and the other of said generally arcuate end portions intersecting and extending beyond said cylindrical plane, said raceway surfaces being arranged so that said intersecting end portion of each said raceway surface is oriented in facing, adjacent relation to said spaced end portion of the other raceway surface with said intersecting end portion of said raceway surface radially inwardmost of the axis of said rotational swiveling of said wheel assembly located more closely adjacent said wheel than said spaced end portion of said radially inwardmost raceway surface, whereby the spacing between said two raceway surfaces is offset from said cylindrical plane through said ball bearing elements.

* * * * *

UNITED STATES PATENT OFFICE
CERTIFICATE OF CORRECTION

Patent No. 4,316,305    Dated February 23, 1982

Inventor(s) F. Leo Seaford

It is certified that error appears in the above-identified patent and that said Letters Patent are hereby corrected as shown below:

Column 3, line 53, delete "12' and 24' " and insert therefor --12" and 24"--. Column 5 line 43, delete "clearly" and insert therefor --closely--. Column 5, line 53, delete "24' " and insert therefor --24"--. Column 6, line 19, after "wheel," delete "said" and insert therefor --and--.

Signed and Sealed this

Tenth Day of August 1982

[SEAL]

Attest:

GERALD J. MOSSINGHOFF

Attesting Officer    Commissioner of Patents and Trademarks